United States Patent [19]

Honda et al.

[11] Patent Number: 5,559,785
[45] Date of Patent: Sep. 24, 1996

[54] OPTIMUM RECORDING LASER POWER CONTROL BY TESTING AN EFT SIGNAL'S ASYMMETRY WITH A FRAME SYNCHRONIZATION CIRCUIT

[75] Inventors: Kazuhiko Honda; Kazunobu Fujiwara; Katsuichi Osakabe, all of Hamamatsu, Japan

[73] Assignee: Yamaha Corporation, Hamamatsu, Japan

[21] Appl. No.: 336,490

[22] Filed: Nov. 9, 1994

[30] Foreign Application Priority Data

Nov. 12, 1993 [JP] Japan .................. 5-307342

[51] Int. Cl.$^6$ .................................. G11B 11/03
[52] U.S. Cl. .................. 369/124; 369/54; 369/58; 369/116
[58] Field of Search .................. 369/54, 59, 109, 369/116, 124, 48, 58, 100, 32

[56] References Cited

U.S. PATENT DOCUMENTS

| | | | |
|---|---|---|---|
| 5,109,373 | 4/1992 | Ohno et al. | 369/116 |
| 5,150,351 | 9/1992 | Ohno et al. | 369/116 |
| 5,161,145 | 11/1992 | Ogawa et al. | 369/59 |
| 5,289,450 | 2/1994 | Mizumoto et al. | 369/54 |
| 5,303,217 | 4/1994 | Bakx et al. | 369/116 |
| 5,305,297 | 4/1994 | Nishiuchi et al. | 369/116 |
| 5,335,215 | 8/1994 | Yoshiyama | 369/43 |
| 5,353,270 | 10/1994 | Iimura | 369/54 |
| 5,412,628 | 5/1995 | Yamazaki et al. | 369/54 |
| 5,416,809 | 5/1995 | Masuda et al. | 369/109 |
| 5,490,127 | 2/1996 | Ohta et al. | 369/54 |

FOREIGN PATENT DOCUMENTS 4-263129  9/1992  Japan .
6-044563  2/1994  Japan .

Primary Examiner—Georgia Y. Epps
Assistant Examiner—Kim-Kwok Chu
Attorney, Agent, or Firm—Loeb & Loeb LLP

[57] ABSTRACT

Test EFM signal reproduced from an optical disk is converted through a slicer into binary value, and a synchronizing signal having an 11T—11T signal pattern is detected by a frame synchronization circuit. Upon detection of the synchronizing signal, a detection timing counter predicts timing when a next synchronizing signal will be detected. The respective level values at the intermediate points of the former and latter 11T sections of the synchronizing signal are sampled and held by sample and hold circuits. Once a next synchronizing signal is detected at the predicted timing, a synchronization determination circuit transfers the outputs of the sample and hold circuits to another sample and hold circuits. The outputs of the other sample and hold circuit are averaged by filters and asymmetry is calculated by an asymmetry calculation circuit. On the basis of the calculated asymmetry, a determination circuit determines an optimum recording power value.

16 Claims, 6 Drawing Sheets

OPTIMUM RECORDING LASER POWER CONTROL BY TESTING AN EFT SIGNAL'S ASYMMETRY WITH A FRAME SYNCHRONIZATION CIRCUIT

BACKGROUND OF THE INVENTION

The present invention relates to optical disk recording devices for recording information on writable optical disks in the CD (Compact Disk) format. More particularly, the present invention relates to an improved optical recording device of such type which can accurately detect so-called "asymmetry" on the basis of reproduced level values of signals recorded on an optical disk and thus accurately determine an optimum recording power value, by being capable of effectively avoiding misdetection of the peak level values of the reproduced signals that would occur due to a defect such as scratch, dust or stain in or on the disk surface, or deficiency in the reflective surface of the disk.

When recording signals on a given recording medium such as a disk or a tape, so-called calibration may sometimes be performed, in which signals are first written, by way of trial, on a predetermined trial writing area of the medium before being actually recorded, then the trial signals are reproduced for examination of the signal quality, and an optimum value of writing energy or recording power to be used is determined on the basis of the signal quality thus examined. According to the known standards for write-once type Compact Disk (CD-WO), the trial writing area is provided on the innermost peripheral portion of the disk and is called a power calibration area (PCA), and a series of the above-noted operations is called optimum power control (OPC).

As an example, the optimum power control is performed in the following manner. First, test EFM (Eight to Fourteen Modulation) signals are written onto the power calibration area of an optical disk while the intensity value of recording laser power is varied either continuously or in a stepwise fashion. The thus-recorded test EFM signals on the power calibration area are then reproduced so as to detect, on the basis of the quality of the reproduced high-frequency EFM signals, a specific position on the calibration area where the EFM signals are written in an optimum condition. Thence, the value of the recording laser power with which the optimum EFM signals are recorded is determined as an optimum power value. The above-mentioned signal quality examination is carried out by detecting the asymmetry of the high-frequency EFM signals.

FIG. 2 shows in block diagram a typical circuitry arrangement conventionally employed for reproducing test EFM signals, previously recorded on an optical disk by use of sequentially varied recording power, so as to detect the asymmetry, and then determining an optimum recording power value on the basis of the detected asymmetry. More specifically, a reproducing laser beam is irradiated onto the power calibration area of the disk where the test EFM signals are recorded and the reflected light from the calibration area of the laser beam is received. High-frequency signals obtained as the received light signals are passed through a high-pass filter 10 which cuts off the direct current component contained in the signals. For each varied value of the recording power, top and bottom peak detection circuits 12 and 14 detect the top peak (positive peak) level At and bottom peak (negative peak) level Ab of each of the high-frequency signals, respectively, by analog processing. An asymmetry calculation circuit 16 calculates the asymmetry β for each value of the recording power using an equation of β=(At+Ab)÷(At−Ab). A determination circuit 18 finds out specific one of the recording power values which can achieve asymmetry that is closest to predetermined optimum asymmetry value (e.g., 0.04) and determines that specific recording power value as an optimum recording power value. By performing actual signal recording using the thus-determined optimum recording value, the best signal quality can be realized.

With the prior art arrangement of FIG. 2, each synchronizing signal of an 11T—11T signal pattern (e.g., a repetitive pattern, which is formed by a former section having a high level for 11T and a latter section having a low level for 11T) will normally have the greatest signal levels, and the top peak level At is detected of the former 11T section while the bottom peak level Ab is detected of the latter 11T section. However, defect such as scratch, dust or stain on the disk surface, or deficiency of the reflective surface of the disk, if any, would frequently be misdetected as a top or bottom peak value. Very often, this would prevent accurate detection of the asymmetry, and hence accurate determination of the optimum recording power value. In order to minimize the adverse influence of such peak value misdetection, it may be proposed to provide filters at the rear of the top and bottom peak detection circuits 12 and 14 in such a manner that the asymmetry calculation is performed after the detected peak values have been averaged. But, because the power calibration area is very narrow and short response time is required, for the asymmetry calculation, the peak value averaging period is considerably limited, so that the influence of the peak value misdetection could not be avoided completely.

Further, with some of the CD-WO disks, when reproducing a long mark (pit) of, say, 11T, there may be caused an appreciable waveform distortion near the trailing edge of the reproduced pit, as shown in FIG. 3. In such a case, the above-mentioned circuitry arrangement of FIG. 2 could not detect the asymmetry with high accuracy because the bottom peak level is detected at a projecting tip of the distorted waveform.

SUMMARY OF THE INVENTION

It is therefore an object of the present invention to provide an improved optical disk recording device which can accurately detect asymmetry on the basis of reproduced levels of recorded optical disk signals and thus accurately determine an optimum recording power value, by being capable of effectively avoiding misdetection of the peak level values of the reproduced signals that would occur due to a defect such as scratch, dust or stain in or on the disk surface, or deficiency of the reflective surface of the disk.

To achieve the above-mentioned object, the present invention provides an optical disk recording device which comprises a test signal recording section for irradiating, onto a writable optical disk, a recording laser beam modulated by a test EFM signal in a CD format, so as to record the test EFM signal on the optical disk, a recording laser power setting section for setting power of the recording laser beam to a desired value, a test signal reproduction section for irradiating a reproducing laser beam onto a part of the optical disk where the test EFM signal is recorded, and receiving reflection from the part of the reproducing laser beam to generate a received beam signal, a synchronizing signal detection section for, from the received beam signal generated by the reproduction section, detecting a synchronizing signal having an 11T—11T signal pattern, a signal level detection section for detecting respective level values of former and latter 11T sections of the synchronizing signal detected by the synchronizing signal detection section, and an asymmetry calculation section for obtaining asymmetry on the basis of the respective level values detected by the level detection section.

The optical disk recording device may further comprise a synchronizing signal detection timing prediction section for, when the synchronizing signal is detected, predicting timing at which next such synchronizing signal will be detected, and a genuine synchronizing signal determination section for, when the next synchronizing signal is detected at or around the timing predicted by the timing prediction section, determining, as a genuine synchronizing signal, the synchronizing signal that is last detected by the synchronizing signal detection section. The asymmetry calculation section obtains the asymmetry on the basis of the level values of the former and latter 11T sections that are detected of the genuine synchronizing signal. The signal level detection section detects the level values at timing corresponding to respective intermediate points of the former and latter 11T sections of the detected synchronizing signal, in such a manner that detection of the level values is not affected by unstable waveform components at ends of the 11T sections.

An optical disk recording device according to another aspect of the present invention comprises a test signal recording section for irradiating, onto a writable optical disk, a recording laser beam modulated by a test EFM signal in a CD format, so as to record the test EFM signal on the optical disk, a power variation section for automatically varying a power value of the recording laser beam in a sequential manner, a test signal reproduction section for irradiating a reproducing laser beam onto a part of the optical disk where the rest EFM signal is recorded, and receiving reflection from the part of the reproducing laser beam to generate a received beam signal, a synchronizing signal detection section for, from the received beam signal generated from the reproduction section, detecting a synchronizing signal having an 11T—11T signal pattern, for each the power value of the recording laser beam varied by the variation section, a signal level detection section for, for each the power value of the recording laser beam, detecting respective level values of former and latter 11T sections of the synchronizing signal detected by the synchronizing signal detection section, an asymmetry calculation section for, for each of the power values of the recording laser beam, obtaining asymmetry on the basis of the respective level values detected by the level detection section, an optimum recording power calculation section for, on the basis of asymmetry obtained for each the power value of the recording laser beam, obtaining an optimum power value of the recording laser beam that can achieve optimum asymmetry, and an actual recording control section for automatically or manually setting the power value varied by the recording laser power variation section to the optimum power value calculated by the calculation section.

According to the first aspect of the present invention, because a synchronizing signal of an 11T—11T signal pattern is detected and asymmetry is obtained on the basis of the respective level values of the former and latter 11T sections of the synchronizing signal, it is possible to effectively avoid misdetection of the peak level values of the reproduced signals that would occur due to a flaw, dust or stain in or on the disk surface or deficiency of the reflective surface of the disk. Thus, the asymmetry for a desired recording power value can be accurately detected, so that the optimum recording power value can be obtained with accuracy.

In a preferred mode, upon detection of the synchronizing signal, timing when a next synchronizing signal will be detected is predicted. If the next synchronizing signal is detected at or around the predicted timing, the preceding synchronizing signal is determined as a genuine synchronizing signal, and the 11T sections level values are detected in response to the genuine synchronizing signal to obtain the asymmetry. This arrangement prevents asymmetry calculation from being made on the basis of misdetected synchronizing signal levels and hence permits enhanced accuracy of the asymmetry detection, with the result that the optimum recording power value can be obtained with even higher accuracy.

In another preferred mode, because the 11T sections level values are detected at such portions from which direct current component is eliminated, the asymmetry can be even more accurately detected and hence the optimum recording power value can be determined with even higher accuracy.

According to another aspect of the invention, because the test EFM signal is recorded with the recording power value sequentially varied, then the recorded signal is reproduced to obtain the asymmetry for each of the varied recording power values, then such an optimum recording power value is determined which can achieve an optimum asymmetry and then actual recording is performed by use of the thus-determined optimum recording power value, the optimum recording power value can be determined with enhanced efficiency and accuracy.

Now, the preferred embodiment of the present invention will be described in detail below with reference to the accompanying drawings.

DESCRIPTION OF THE PREFERRED EMBODIMENT

Figure 4:
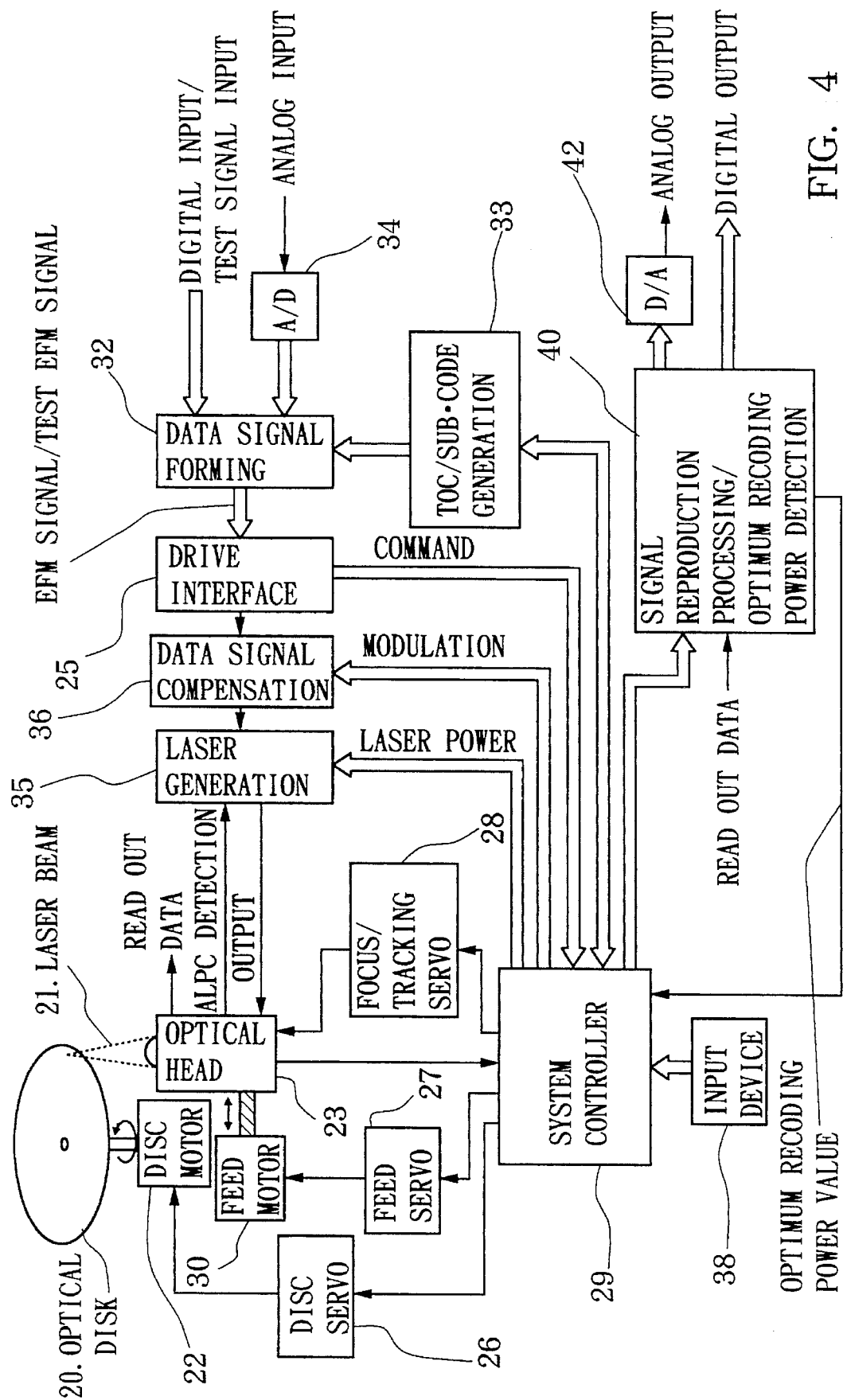
FIG. 4 is a block diagram of the general structure of an optical disk recording/reproducing device to which the present invention is applied.

An embodiment of the present invention will be described here in relation to an example case where information is recorded on a dye-laser/write-once type compact disk in accordance with the CD-WO standards. FIG. 4 is a block diagram illustrating the general structure of an optical disk recording/reproducing device to which the present invention is applied.

In accordance with instructions given from a system controller 29, a focus servo/tracking servo circuit 28 controls the focus and-tracking of a laser beam 21 irradiated from a semiconductor laser provided within an optical head 23. The tracking control is performed by detecting pro-formed grooves (so-called "pro-groove", in the optical disk 20. A feed servo circuit 27, in accordance with instructions given from the system controller 29, drives a feed motor 30 so as to move the optical head 23 along the radius of the disk 20.

The actual recording on the optical disk 20 is carried out in the following manner. At a rate corresponding to a selected recording speed, each data signal to be recorded on the optical disk 21 is input to a data signal forming circuit 32 directly if it is a digital signal, or by way of an A/D converter 34 if it is an analog signal. The data signal forming circuit 32 interleaves the input data with error check codes and imparts the input data TOC (Table of Contents) information and sub-code information which are generated by a TOC/sub-code generation circuit 33. The data signal forming circuit 32 then performs eight-to-fourteen modulation (EFM) on the input data, so as to form serial data in the CD standards format. The thus-formed serial data are output at a transfer rate corresponding to the selected recording speed.

The output data signal from the data signal forming circuit 32 is applied, via a drive interface 25, to a data signal compensation circuit 36, where it is subjected to modulation based on a so-called (n−1) strategy or the like. The modulated data signal is input to a laser generation circuit 35. In accordance with the input data signal, the laser generation circuit 35 drives the semiconductor laser within the optical head 23 irradiate a laser beam onto the recording surface of the optical disk 20. Thus, pits are formed in the optical disk for recording of desired data. The laser power used for this purpose is precisely controlled by an automatic laser power control (ALPC) circuit to be a predetermined optimum power value. Such control allows the desired data to be recorded on the optical disk 21 in the CD standards format and at the CD standards transfer speed with a linear speed of 1.2 to 1.4 m/s.

By irradiating a reproducing laser beam onto the optical disk where the data signals are recorded in the above-mentioned manner, the data can be reproduced or read out to be demodulated by means of a signal reproduction processing/optimum recording power detection circuit 40, and then the read-out data are output directly in digital format or after having been converted into an analog format by means of an A/D converter 42.

Figure 5:
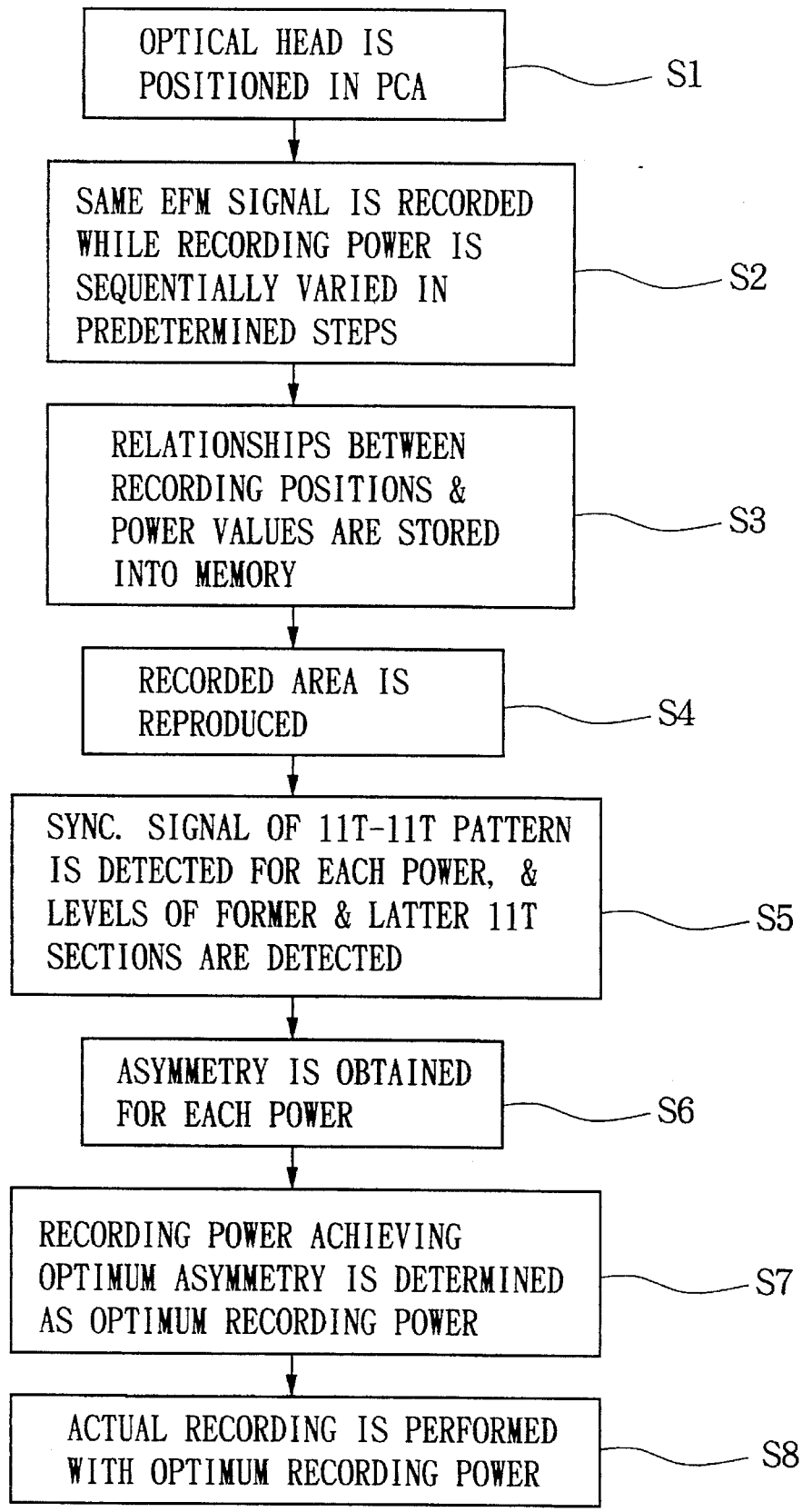
FIG. 5 is a flowchart of a process for determining optimum recording power in the device of FIG. 4.

Prior to the actual recording, calculation of the optimum recording power value is carried out in a manner as flow-charted in FIG. 5. First of all, the optical head 23 is positioned in the power calibration area of the optical disk 20 that is provided inside and along the inner periphery of a read-in area of the disk 21 (step S1). Then, test EFM signal is generated to be used to modulate the recording laser beam 21 for trial writing onto the optical disk 20 (step S2). At this time, the laser generation circuit 35, in accordance with instructions from the system controller 29, records the test EFM signal while sequentially varying the value of the recording power (e.g., varying the value in 15 steps from 4.1 mW to 7.7 mW by 0.3 mW), in such a manner that the same EFM signal is recorded a plurality of times for each of the varied power values. Preferably, the recording time for each step is one ATIP frame (1/75 sec.), during which time test EFM signals are repetitively recorded at a 588 channel-bit frequency with an 11T—11T synchronizing signal positioned at the head. Here, the respective positions and values of the recording power used are identified by performing the recording while detecting position information (ATIP) previously recorded on the disk 20. Corresponding relationships between the identified positions and values of the recording power are stored into a memory within the system controller 29, etc.

After completion of the test EFM signal recording, the operation mode of the device is changed over to a reproduction mode, in which a reproducing laser beam 21 of a given power value is irradiated from the optical head 23 onto the part of the optical disk where the test EFM signals are recorded, so as to reproduce the EFM signals (step S4). For each of the recorded positions (and hence for each of the varied recording power values), the signal reproduction processing/optimum recording power detection circuit 40 detects a synchronizing signal, of the test EFM signal, having an 11T—11T signal pattern (step S5), and samples the respective level values of the former and latter 11T sections so as to obtain the asymmetry for each recording power value (step S6).

Then, specific one of the recording power values which achieves asymmetry closest to predetermined optimum asymmetry is determined as an optimum recording power value (step S7). It is to be noted here that the optimum recording power value may be obtained by interpolative operation on the basis of relationships between the stepwise-obtained asymmetry and varied recording power values. Data representing the determined optimum recording power value is provided to the system controller 29 so that the laser generation circuit 35 is set to this optimum recording power value to carry out the desired actual recording(step S8).

Determination of the optimum recording power value based on the detected asymmetry (step S7) may be performed by, rather than the arithmetic operation within the optical disk reproducing/recording device, displaying the asymmetry detected for each recording power value, so that the operator can determine the optimum value on his or her own judgment. Further, the setting operation of the optimum recording power value in step S8 may also be done manually by the operator.

Next, with reference to FIG. 1, a description will be made on a detailed example of an optimum recording power detection section of the signal reproduction processing/optimum recording power detection circuit 40 shown in FIG. 4. This circuit 40 is composed of a sampling timing formation block 44 for forming timing signals for sampling the levels of the 11T—11T synchronizing signal in the reproduced test EFM signal, and an optimum power value detection block 46 for obtaining the optimum power value on the basis of the sampled synchronizing signal levels. Each of the blocks 44 and 46 will be described as follows.

(1) Sampling Timing Formation Block 44:

Each reproduced test EFM signal (high frequency signal) is converted by a slicer 48 into binary number "1" or "0" and is subjected to a clock pulse extraction operation performed by a clock reproduction circuit 50. A frame synchronization detection circuit 52 detects the 11T-11T synchronizing signal to output a detection pulse PA. A synchronizing signal detection prediction counter 54 is reset by the detection pulse PA to count the reproduced clock pulse, so that this counter outputs a pulse PB at or around such timing when a next synchronizing signal is predicted (timing of a 588th count). The counter 54 also outputs sampling pulses T1 and T2 that are used for detecting the levels of the former and latter 11T sections of the synchronizing signal before the pulse PB is output, so that the levels are detected at timing corresponding to the intermediate points (5 or 6T from the respective start points) of the 11T sections.

Figure 6:
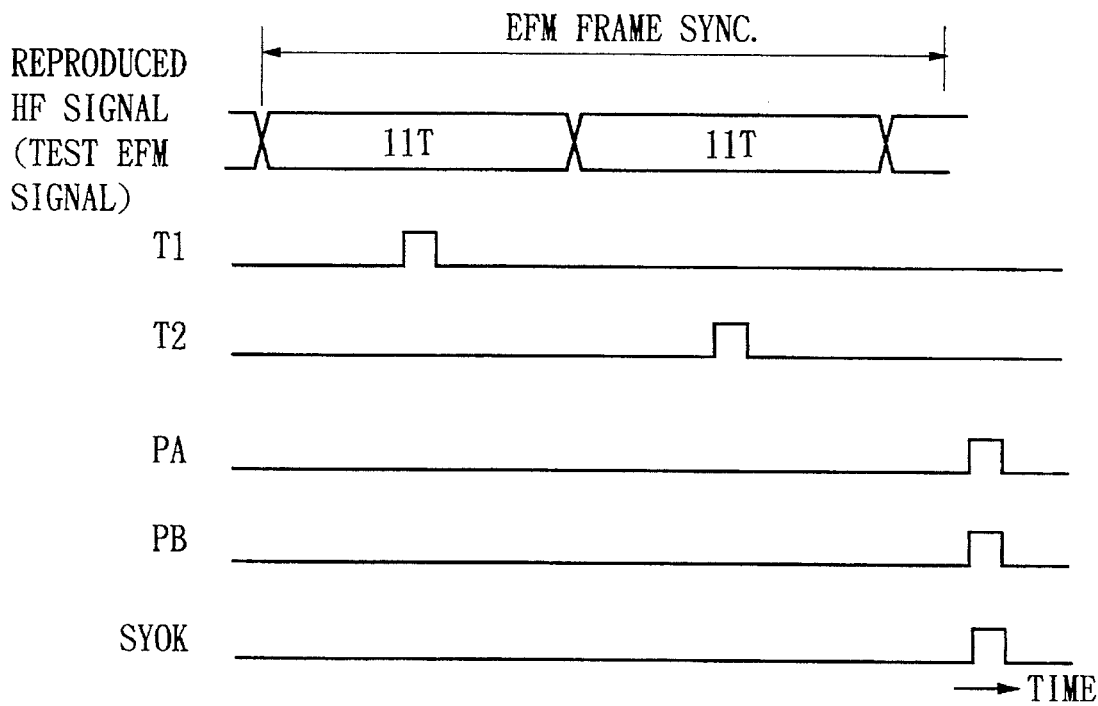
FIG. 6 is a timing chart illustrating signal timing in various sections of the device of FIG. 4.

A synchronization determination circuit 56 determines whether or not the timing of the pulses PA and PB are coincident with each other, and upon determination in the affirmative., the circuit 56 outputs a genuine synchronization signal detection signal SYOK assuming that the last-detected synchronizing signal is a genuine synchronizing signal. The operation of the sampling timing formation block 44 is shown in FIG. 6. The above-mentioned are substantially known arrangements which have conventionally been employed for demodulating the reproduced test EFM signals, except for the construction for generating the sampling pulses T1 and T2.

(2) Optimum Power Value Detection Block 46:

The reproduced test EFM signal is passed through a high-pass filter 58 by which direct current component of the signal is cut off therefrom. The cut-off time constant of the high-pass filter 58 is set such that it is sufficiently smaller than the time (1/75, for example) which, when reproducing the trial-written power calibration area by varying the recording power stepwise, is required for reproducing one of the steps, and also such that it will not distort the reproduced test EFM signal. The level values of the high-frequency signal from which direct current component has been cuff off are sampled and held by sample and hold circuits 60 and 62 at the timing T1 and T2, and they are then transferred to second sample and hold circuits 64 and 66. The second sample and hold circuits 64 and 66 sample and hold the levels in response to the genuine synchronizing signal SYOK. This means that the circuits 64 and 66 sample and hold the level values only when the frame synchronization is proper, i.e., when the input signals to the second sample and hold circuits 64 and 66 both have a proper value.

The outputs from the second sample and hold circuits 64 and 66 are then applied to filter circuits 68 and 70 which provide respective averaged values A1 and A2 for the same recording power value. Because these values A1 and A2 are detected by the above-mentioned digital processing operations that sample and hold the synchronizing signal at specific timing, the values A1 and A2 will respectively have positive and negative, or negative and positive polarities.

An asymmetry calculation circuit 72 computes an expression of $\beta=(A1+A2)\div|A1-A2|$ so as to obtain the asymmetry for each recording power value. With this computation, the asymmetry can be accurately detected as in the prior art, irrespective of the polarities of the values A1 and A2. A determination circuit 74 selects specific one of the recording power values which achieves asymmetry closest, of all the asymmetry detected for the individual power values, to predetermined optimum asymmetry (for example, $\beta=0.04$), and the circuit 74 determines the selected power value as an optimum recording power value to be used for the actual recording.

According to the embodiment as described above, because the synchronizing signal having an 11T11T signal pattern is detected and asymmetry is obtained on the basis of the respective level values of the former and latter 11T sections of the signal, it is possible to effectively avoid misdetection of the peak level values of the reproduced signals that would occur due to a defect such as scratch, dust or stain in or on the disk surface, or deficiency of the reflective surface of the disk. Thus, the asymmetry for each of the varied recording power values can be accurately detected, with the result that the optimum recording power value can be obtained with high accuracy.

Further, according to the described embodiment, upon detection of a synchronizing signal, timing when a next synchronizing signal will be detected is predicted; if the next synchronizing signal is detected at or around the predicted timing, the last-detected synchronizing signal is determined as a genuine synchronizing signal; and the 11T sections level values are detected in response to the genuine synchronizing signal to obtain asymmetry. This arrangement effectively prevents the asymmetry calculation from being made on the basis of a misdetected synchronizing signal and permits enhanced accuracy of the asymmetry detection, with the result that the optimum recording power value can be obtained with even higher accuracy. Moreover, because the 11T sections level values are detected at the respective intermediate points thereof, the asymmetry can be even more accurately detected so as to obtain the optimum recording power value with utmost accuracy.

Figure 1:
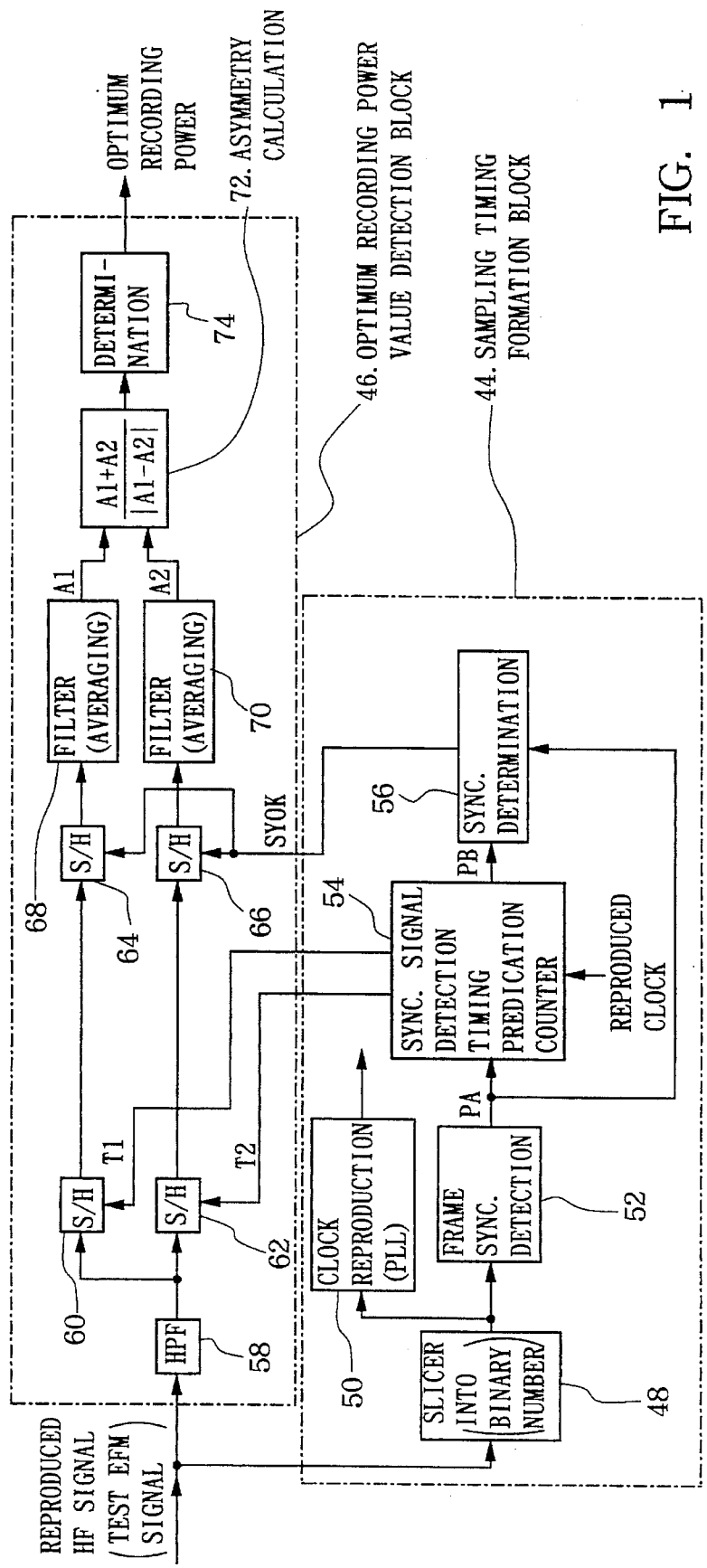
FIG. 1 is a block diagram of an optical disk recording device in accordance with an embodiment of the present invention, illustrating a detailed example of an optimum recording power detection section in a signal reproduction processing/optimum recording power determination circuit of FIG. 4.
Figure 2:
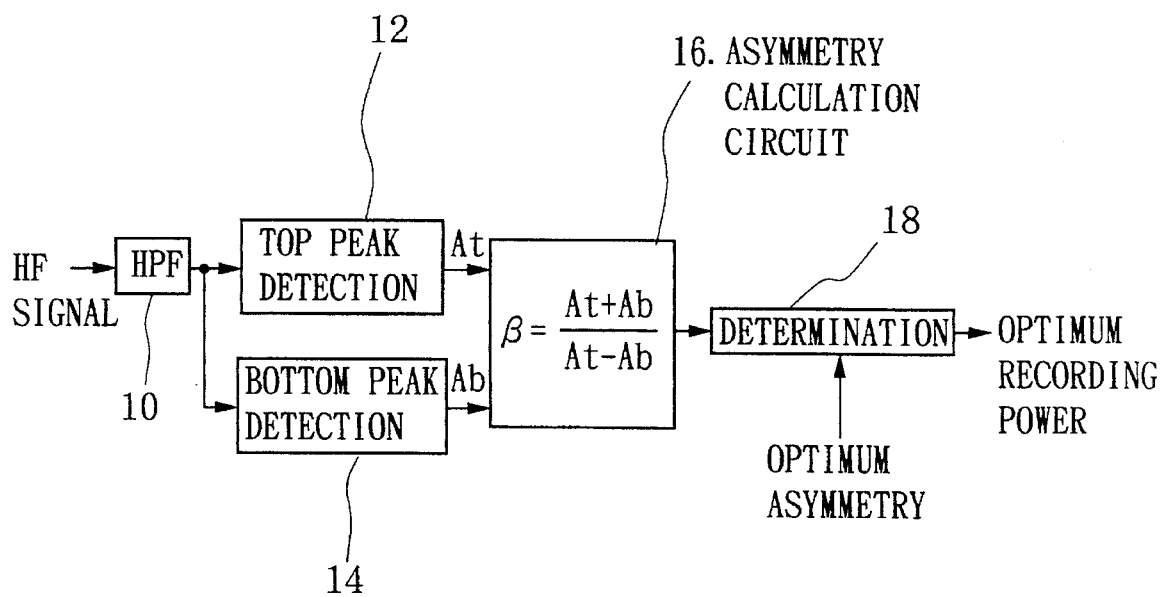
FIG. 2 is a block diagram of a prior art circuitry arrangement for determining optimum recording power.
Figure 3:
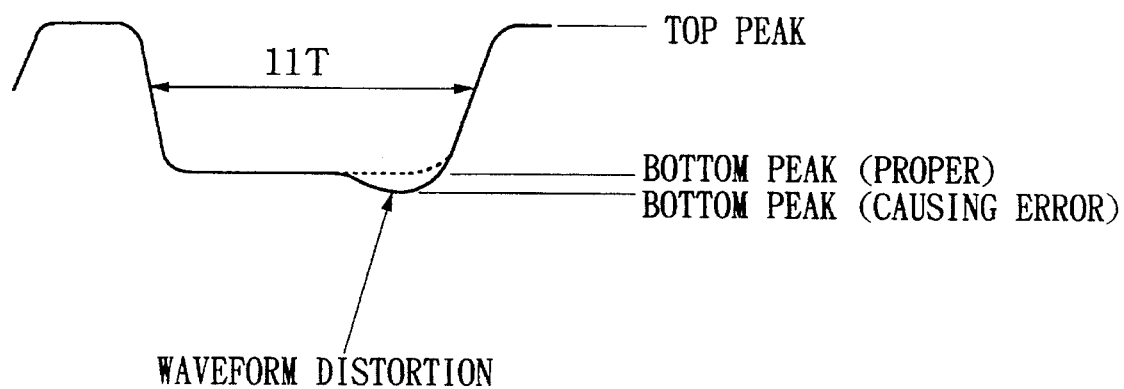
FIG. 3 is a waveform diagram showing a waveform distortion at the trailing edge of a reproduced 11T pit.
Figure 8:
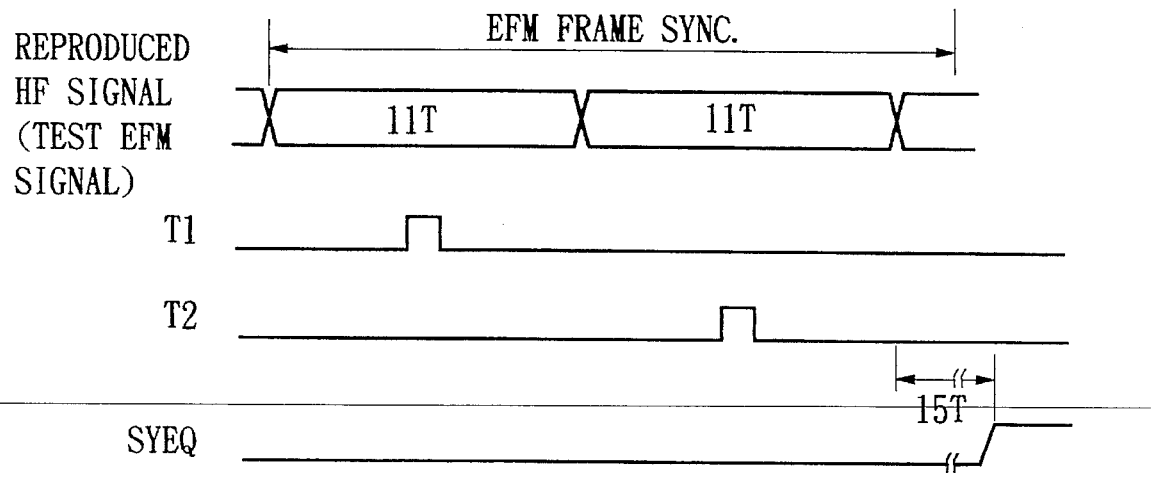
FIG. 8 is a timing chart illustrating signal timing in various sections of the device of FIG. 7.
Figure 7:
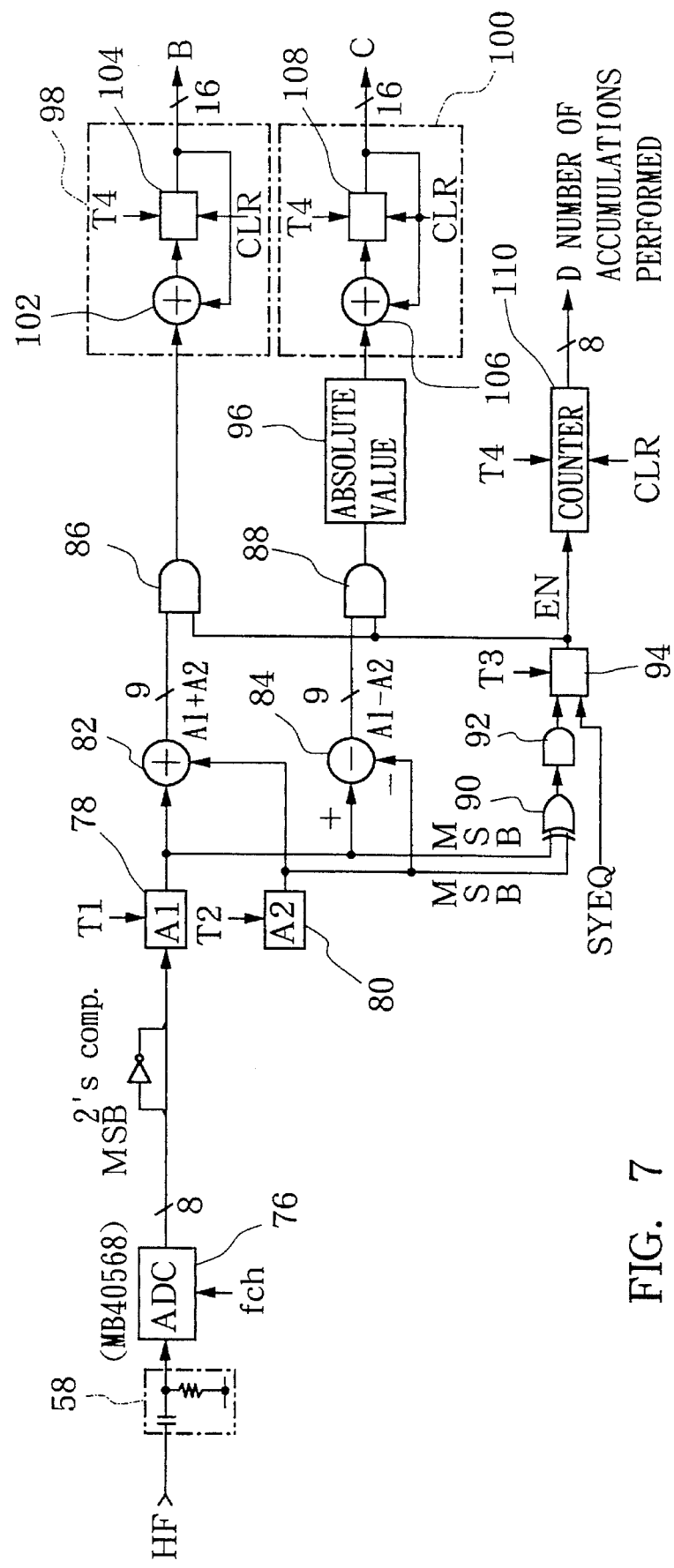
FIG. 7 is a diagram of an example of circuitry when an optimum power value determination block of FIG. 1 is digitized.

FIG. 7 shows an example of circuitry when the optimum power value detection block 46 of FIG. 1 is digitized. A genuine synchronizing signal detection signal SYEQ shown in FIG. 1 is similar to the genuine synchronizing signal SYOK of FIG. 1 in that the detection signal SYEQ turns into a value "1" when synchronizing signal detection timing PA and next synchronizing signal prediction timing PB coincide with each other, but is different from the signal SYOK in that the signal SYEQ is maintained at "1" until the next synchronizing signal prediction timing PB (FIG. 8). Thus, the genuine synchronizing signal detection signal SYEQ is maintained at "1" as long as a synchronizing signal is detected at such synchronizing signal prediction timing; however after the time when no synchronizing signal is detected at the prediction timing, the signal SYEQ is maintained at "0" until a next synchronizing signal is detected at any of subsequent synchronizing signal prediction timing.

Each reproduced EFM signal (2's complement code) is passed to a high-pass filter 58 which cuts off the direct current component contained therein, and is then quantized through an A/D converter 76. Reproduced clock pulse of the EFM signal is also used as sampling clock pulse for the A/D converter 36. Since the degitized out-put of the A/D converter 36 is a binary code, the polarity bit of the signal is inverted to be converted into 2's complement and then latched into timing latch circuits 78 and 80 at timing of the sampling pulses T1 and T2, so that the sum A1+A2 and difference A1−A2 are obtained by an adder 82 and a subtracter 84, respectively. The respective outputs of the adder and subtracter 82 and 84 are gated by AND circuits 86 and 88.

Gating signal of the AND circuits 86 and 88 is obtained by ANDing, through an AND circuit 92, the genuine synchronizing signal SYEQ and a signal that has been obtained by providing an exclusive OR circuit 90 with the respective polarity signals (the most significant bit of the 2's complement code) of the signals latched in the latch circuit 78 and 90, and then latching the ANDed result into a latch 94 at timing of signal T3 (signal which is output upon detection of genuine synchronization, or at timing following the predicted timing if no such genuine synchronization is detected, as seen from FIG. 8). As data selection conditions for obtaining the asymmetry, this requires that the synchronizing signal be detected at proper timing and also the polarities of the data sampled by the sampling pulses T1 and T2 be always either positive and negative or negative and positive. If these conditions are satisfied, then "1" is latched into the latch circuit 94 at the timing of the signal T3, but otherwise, "0" is latched into the latch circuit 94 at that timing.

The difference signal A1–A2 gated through the AND circuit 88 is converted by an absolute value circuit 96 into an absolute value and then provided to an accumulator 100, while the sum signal A1+A2 gated through the AND circuit 86 is directly provided to an accumulator 98. These accumulators 98 and 100 correspond to the filters 68 and 70 of FIG. 1. In the accumulator 98, an adder 102 adds together the output of the AND circuit 86 and output of a latch circuit 104, and the added result from the adder 102 is then latched into the latch circuit 104 at the timing of signal T4 (signal which is output at the next timing to signal T3 as seen from FIG. 8), so that the sum signal A1+A2 is accumulated (averaged) in a sequential manner. On the other hand, In the accumulator 100, an adder 106 adds together the output of the absolute value circuit 108 and output of a latch circuit 108, and the added result from the adder 106 is then latched into the latch circuit 108 at the timing of the signal T4, so that the absolute value of the difference signal |A1–A2| is accumulated (averaged) in a sequential manner.

The counter 110 is enabled by the output of the latch circuit 94 to count the number of accumulations performed by the accumulators 98 and 100 at the timing of the signal T4. If the above-mentioned data selection conditions come to be unsatisfied in the course of the accumulation operation, "0" is latched into the latch circuit 94 at the timing of the signal T3, and thus the outputs of the AND circuits 86 and 88 both become "0" so that the accumulated values of the accumulators 98 and 100 stay unchanged. The count value of the counter 110 stays unchanged as well. Accordingly, the accumulators 98 and 100 output the same sum A1+A2 and the absolute value of the difference |A1–A2| as when the above-mentioned data selection conditions are satisfied, so that the counter 110 outputs data D that is indicative of the number of accumulations actually performed.

Clear signal CLR is applied to the accumulators 98 and 100 once data accumulation is finished for the last EFM frame of one ATIP frame and its accumulated value is loaded into a next stage. Output data B, C and D are sent to a microcomputer etc., where B C is computed on the basis of the data B and C obtained when the data D indicative of the number of the accumulation has reached a predetermined value for a same recording power value. In this manner, the asymmetry for the recording power value is calculated. The above-mentioned operations are performed for each of the recording power values, in such a manner that specific one of the recording power values which achieves asymmetry closest to the optimum asymmetry is determined as an optimum recording power value.

Although the preferred embodiment has been described so far in relation to a recording/reproducing device for CD-WO standards optical disks, it should be appreciated that the present invention is also applicable to recording and reproduction of optical disks of various other standards as long as recording power is controllable by use of asymmetry of reproduced signals. For instance, the present invention may be applied to magneto-optical disks, because asymmetry control is permitted provided that the disks are subjected to light modulation recording.

What is claimed is:

1. An optical disk recording device comprising:

test signal recording means for in irradiating, onto a writable optical disk, a recording laser beam modulated by a test EFM signal in a CD format, so as to record the test EFM signal on the optical disk;

recording laser power setting means for setting power of the recording laser beam to a desired value;

test signal reproduction means for irradiating a reproducing laser beam onto a part of the optical disk where the test EFM signal is recorded, and receiving a reflection from said part of the optical disk to generate a received beam signal;

synchronizing signal detection means responsive to the received beam signal generated by said test signal reproduction means, for detecting a synchronizing signal having an 11T—11T signal pattern in which the pattern is repetitive and is formed by a former section having a high level for 11T and a latter section having a low level for 11T;

signal level detection means for detecting corresponding peak level values of former and latter 11T sections of the synchronizing signal detected by said synchronizing signal detection means; and asymmetry calculation means for obtaining asymmetry of the test EFM signal on the basis of the corresponding peak level values detected by said signal level detection means.

2. An optical disk recording device as defined in claim 1, which further comprises:

synchronizing signal detection timing prediction means for, when the synchronizing signal is detected, predicting a timing at which a next such synchronizing signal will be detected; and genuine synchronizing signal determination means for, when the next synchronizing signal is detected at or around the timing predicted by said timing prediction means, determining, as a genuine synchronizing signal, the synchronizing signal that is last detected by said synchronizing signal detection means, wherein said asymmetry calculation means obtains the asymmetry on the basis of the level values of the former and latter 11T sections that are detected in the genuine synchronizing signal.

3. An optical disk recording device as defined in claim 1, wherein said signal level detection means detects said level values at a timing corresponding to respective intermediate points of the former and latter 11T sections of the detected synchronizing signal, in such a manner that detection of said level values is not affected by unstable waveform components at ends of the 11T sections.

4. An optical disk recording device comprising:

test signal recording means for irradiating, onto a writable optical disk, a recording laser beam modulated by a test EFM signal in a CD format, so as to record the test EFM signal on the optical disk;

power variation means for automatically varying a power value of the recording laser beam in a sequential manner;

test signal reproduction means for irradiating a reproducing laser beam onto a part of the optical disk where the test EFM signal is recorded, and receiving a reflection from said part of the optical disk to generate a received beam signal;

synchronizing signal detection means responsive to the received beam signal generated from said test signal reproduction means, for detecting a synchronizing signal having an 11T—11T signal pattern in which the pattern is repetitive and is formed by a former section having a high level for 11T and a latter section having a low level for 11T, for each power value of the recording laser beam varied by said power variation means;

signal level detection means for detecting, for each power value of the recording laser beam, corresponding peak level values of former and latter 11T sections of the synchronizing signal detected by said synchronizing signal detection means;

asymmetry calculation means for obtaining, for each power value of the recording laser beam, asymmetry of the test EFM signal on the basis of the corresponding peak level values detected by said signal level detection means;

optimum recording power calculation means for, on the basis of the asymmetry obtained for each power value of the recording laser beam, obtaining an optimum power value of the recording laser beam that can achieve optimum asymmetry; and actual recording control means for automatically or manually setting the power value varied by said recording laser power variation means to the optimum power value calculated by said optimum recording power calculation means.

5. An optical disk recording device for a writable optical disk, the device comprising:

a test signal recording circuit that irradiates a recording laser beam modulated by a test EFM signal in a CD format, so as to record the test EFM signal on the optical disk;

a recording laser power setting circuit that sets a power level of the recording laser beam to a desired value;

a test signal reproduction circuit that irradiates a reproducing laser beam onto a part of the optical disk where the test EFM signal is recorded, and receives a reflection from the part of the optical disk to generate a received beam signal;

a synchronizing signal detection circuit that, from the received beam signal generated by the test signal reproduction circuit, detects a synchronizing signal having an 11T—11T signal pattern in which the pattern is repetitive and is formed by a former section having a high level for 11T and a latter section having a low level for 11T;

a signal level detection circuit that detects corresponding peak level values of former and latter 11T sections of the synchronizing signal detected by the synchronizing signal detection circuit; and an asymmetry calculation circuit that obtains asymmetry of the test EFM signal on the basis of the corresponding peak level values detected by the signal level detection circuit.

6. An optical disk recording device as defined in claim 5, further comprising:

a synchronizing signal detection timing prediction circuit that, when the synchronizing signal is detected, predicts a timing at which a next such synchronizing signal will be detected; and a genuine synchronizing signal determination circuit that, when the next synchronizing signal is detected at or around the timing predicted by the synchronizing signal detection timing prediction circuit, determines, as a genuine synchronizing signal, the synchronizing signal that is last detected by the synchronizing signal detection circuit, wherein the asymmetry calculation circuit obtains the asymmetry on the basis of the level values of the former and latter 11T sections that are detected in the genuine synchronizing signal.

7. An optical disk recording device as defined in claim 5, wherein the signal level detection circuit detects the level values at a timing corresponding to respective intermediate points of the former and latter 11T sections of the detected synchronizing signal, in such a manner that detection of the level values is not affected by unstable waveform components at ends of the 11T sections.

8. An optical disk recording device for a writable optical disk, the device comprising:

a test signal recording circuit that irradiates a recording laser beam modulated by a test EFM signal in a CD format, so as to record the test EFM signal on the optical disk;

a power variation circuit that automatically varies a power value of the recording laser beam in a sequential manner;

a test signal reproduction circuit that irradiates a reproducing laser beam onto a part of the optical disk where the test EFM signal is recorded, and receives a reflection from the part of the optical disk to generate a received beam signal;

a synchronizing signal detection circuit that, from the received beam signal generated from the test signal reproduction circuit, detects a synchronizing signal having an 11T—11T signal pattern in which the pattern is repetitive and is formed by a former section having a high level for 11T and a latter section having a low level for 11T, for each power value of the recording laser beam varied by the power variation circuit;

a signal level detection circuit that, for each power value of the recording laser beam, detects corresponding peak level values of former and latter 11T sections of the synchronizing signal detected by the synchronizing signal detection circuit;

an asymmetry calculation circuit that, for each power value of the recording laser beam, obtains asymmetry of the test EFM signal on the basis of the corresponding peak level values detected by the signal level detection circuit;

an optimum recording power calculation circuit that, on the basis of the asymmetry obtained for each power value of the recording laser beam, obtains an optimum power value of the recording laser beam that can achieve optimum asymmetry; and an actual recording control circuit that automatically or manually sets the power value varied by the recording laser power variation circuit to the optimum power value calculated by the optimum recording power calculation circuit.

9. A method of determining signal asymmetry in an optical disk recording device for use with a writable optical disk, the method comprising the steps of:

irradiating a recording laser beam modulated by a test EFM signal in a CD format, so as to record the test EFM signal on the optical disk;

setting a power level of the recording laser beam to a desired value;

irradiating a reproducing laser beam onto a part of the optical disk where the test EFM signal is recorded;

receiving a reflection from said part of the optical disk to generate a received beam signal;

detecting a synchronizing signal having an 11T—11T signal pattern in which the pattern is repetitive and is formed by a former section having a high level for 11T and a latter section having a low level for 11T from the received beam signal;

detecting corresponding peak level values of former and latter 11T sections of the detected synchronizing signal; and obtaining asymmetry of the test EFM signal on the basis of the corresponding detected peak level values.

10. A method as defined in claim 9, further comprising the steps of:

predicting a timing at which a next such synchronizing signal will be detected when the synchronizing signal is detected; and determining, as a genuine synchronizing signal, the last detected synchronizing signal when the next synchronizing signal is detected at or around the predicted timing, wherein the asymmetry is obtained on the basis of the level values of the former and latter 11T sections that are detected in the genuine synchronizing signal.

11. A method as defined in claim 9, wherein the level values are detected at a timing corresponding to respective intermediate points of the former and latter 11T sections of the detected synchronizing signal, in such a manner that detection of the level values is not affected by unstable waveform components at ends of the 11T sections.

12. A method of determining signal asymmetry in an optical disk recording device for use with a writable optical disk, the method comprising the steps of:

irradiating a recording laser beam modulated by a test EFM signal in a CD format, so as to record the test EFM signal on the optical disk;

automatically varying a power value of the recording laser beam in a sequential manner;

irradiating a reproducing laser beam onto a part of the optical disk where the test EFM signal is recorded;

receiving a reflection from the part of the optical disk to generate a received beam signal;

detecting a synchronizing signal having an 11T—11T signal pattern in which the pattern is repetitive and is formed by a former section having a high level for 11T and a latter section having a low level for 11T from the received beam signal, for each power value of the varied recording laser beam;

detecting corresponding peak level values of former and latter 11T sections of the detected synchronizing signal for each power value of the recording laser beam;

obtaining asymmetry of the test EFM Signal on the basis of the detected corresponding peak level values for each power value of the recording laser beam;

obtaining an optimum power value of the recording laser beam that can achieve optimum asymmetry on the basis of the asymmetry obtained for each power value of the recording laser beam; and automatically or manually setting the varied power value to the calculated optimum power value.

13. An optical disk recording device for a writable optical disk having a test signal recorded thereon, the device comprising:

a test signal reproduction circuit that irradiates a reproducing laser beam onto a part of the optical disk where the test signal is recorded, and receives a reflection from the part of the optical disk to generate a received beam signal;

a synchronizing signal detection circuit that, from the received beam signal generated by the test signal reproduction circuit, detects a synchronizing signal having an 11T—11T signal pattern in which the pattern is repetitive and is formed by a former section having a high level for 11T and a latter section having a low level for 11T;

a signal level detection circuit that detects corresponding peak level values of former and latter 11T sections of the synchronizing signal detected by the synchronizing signal detection circuit; and an asymmetry calculation circuit that obtains asymmetry of the test signal on the basis of the corresponding peak level values detected by the signal level detection circuit.

14. An optical disk recording device as defined in claim 13, further comprising:

a synchronizing signal detection timing prediction circuit that, when the synchronizing signal is detected, predicts a timing at which a next such synchronizing signal will be detected; and a genuine synchronizing signal determination circuit that, when the next synchronizing signal is detected at or around the timing predicted by the synchronizing signal detection timing prediction circuit, determines, as a genuine synchronizing signal, the synchronizing signal that is last detected by the synchronizing signal detection circuit, wherein the asymmetry calculation circuit obtains the asymmetry on the basis of the level values of the former and latter 11T sections that are detected in the genuine synchronizing signal.

15. An optical disk recording device as defined in claim 13, wherein the signal level detection circuit detects the level values at a timing corresponding to respective intermediate points of the former and latter 11T sections of the detected synchronizing signal, in such a manner that detection of the level values is not affected by unstable waveform components at ends of the 11T sections.

16. An optical disk recording device as defined in claim 13, further comprising:

a power variation circuit that automatically varies a power value of a recording laser beam in a sequential manner, wherein the synchronizing signal detection circuit detects a synchronizing signal having an 11T—11T signal pattern for each power value of the recording laser beam varied by the power variation circuit, wherein the signal level detection circuit detects corresponding peak level values of former and latter 11T sections of the synchronizing signal detected by the synchronizing signal detection circuit for each power value of the recording laser beam, and wherein the asymmetry calculation circuit obtains asymmetry of the test signal on the basis of the corresponding peak level values detected by the signal level detection circuit for each power value of the recording laser beam;

an optimum recording power calculation circuit that, on the basis of the asymmetry obtained for each power value of the recording laser beam, obtains an optimum power value of the recording laser beam that can achieve; optimum asymmetry; and an actual recording control circuit that automatically or manually sets the power value varied by the recording laser power variation circuit to the optimum power value calculated by the optimum recording power calculation circuit.

* * * * *